(12) United States Patent
Hao

(10) Patent No.: US 8,364,689 B2
(45) Date of Patent: Jan. 29, 2013

(54) METHODS AND APPARATUS FOR PROVIDING A LOCATION BASED SEARCH

(75) Inventor: Jianxiu Hao, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 324 days.

(21) Appl. No.: 11/615,519

(22) Filed: Dec. 22, 2006

(65) Prior Publication Data
US 2008/0154876 A1 Jun. 26, 2008

(51) Int. Cl.
*G06F 7/00* (2006.01)
*G06F 17/30* (2006.01)

(52) U.S. Cl. ........................................... 707/758
(58) Field of Classification Search .................. 707/758
See application file for complete search history.

(56) References Cited

U.S. PATENT DOCUMENTS

| | | | |
|---|---|---|---|
| 6,026,398 A * | 2/2000 | Brown et al. ................. | 707/745 |
| 6,101,496 A * | 8/2000 | Esposito ....................... | 701/532 |
| 6,226,646 B1 * | 5/2001 | Geurts .......................... | 715/210 |
| 6,498,982 B2 * | 12/2002 | Bellesfield et al. ........... | 701/533 |
| 6,701,307 B2 * | 3/2004 | Himmelstein et al. ............ | 707/3 |
| 6,879,980 B1 * | 4/2005 | Kothuri et al. .................... | 707/5 |
| 7,136,474 B2 * | 11/2006 | Shaffer et al. ............... | 379/211.02 |
| 7,373,246 B2 * | 5/2008 | O'Clair ......................... | 701/208 |
| 7,376,636 B1 * | 5/2008 | Wang et al. ................... | 707/694 |
| 7,376,640 B1 * | 5/2008 | Anderson et al. ................. | 707/3 |
| 7,379,811 B2 * | 5/2008 | Rasmussen et al. .......... | 701/208 |
| 7,685,191 B1 * | 3/2010 | Zwicky et al. ................ | 707/706 |
| 2004/0023666 A1 * | 2/2004 | Moon et al. ................ | 455/456.1 |
| 2005/0076009 A1 * | 4/2005 | Yoshimura et al. ............... | 707/3 |
| 2006/0245572 A1 * | 11/2006 | Asher et al. .............. | 379/220.01 |

* cited by examiner

Primary Examiner — Robert Beausoliel, Jr.
Assistant Examiner — Michael Pham

(57) ABSTRACT

Methods and apparatuses for providing location based searches and other services are provided. Embodiments may include dividing a searchable region into quad regions and populating the search regions with a plurality of listings. The division of quad regions may be dependent on a maximum number of listings per quad region and a minimum size for any one quad region. Embodiments may include assigning unique identifiers to each quad regions and assigning the unique identifiers to each of the listings according to the quad region in which the listings are located as geographical codes. The geographical codes may be used as part a location based search. In some of the embodiments, the listings may be searched by prefixes of the geographical codes rather than the entire geographical codes.

23 Claims, 8 Drawing Sheets

METHODS AND APPARATUS FOR PROVIDING A LOCATION BASED SEARCH

BACKGROUND INFORMATION

String-based search engines allow a user to find a particular business within a defined area. For example, if a user wants to find the Hilton Hotel in Waltham, Mass., a string-based engine can be deployed to search the following in a database: "Hilton" AND "hotel" AND "Waltham" in order to find a listing having the attributes of Hilton, hotel, and Waltham. A "listing" refers to one item or one record of data in the database. In at least some string-based search systems, the listing type (e.g., hotel), the listing name (e.g., Hilton), and the listing location (e.g., Waltham) may be stored into three database tables or data files, and the listing type, name, and location may be indexed, i.e., sorted and stored, so that the listing can be retrieved using a method such as a binary search.

However, challenges may arise for a search that does not include only a string of attributes but rather also includes searching for particular listings based on the listings proximity to a point of reference, referred to as a location based search. An example of a location based search may be "Hilton Hotels within 10 miles of the location: 100 Main Street, Waltham, Mass."

According to one known method, a location based search may include assigning geographical or quad codes to each listing of a database according to the location of the listing within a sub-region of an entire searchable region. Each listing within a particular sub-region has a quad code. In the example presented above, the method may include determining each sub-region that has at least a portion that is within 10 miles of 100 Main Street, Waltham, Mass. and then searching only those listings that are within one of the sub-regions having any portion within 10 miles of 100 Main Street, Waltham, Mass. Determining the sub-regions that have at least a portion that overlaps a search area or area of interest, allows for the filtering out of all of the listings in sub-regions that do not have any overlap and thus may help decrease the time to conduct the search.

In this known method, the size of the individual sub-regions presents a trade-off. Relatively large sub-regions (in terms of geographical size per sub-region) decrease the number of sub-regions that are likely to have a portion within the area of interest and thus decrease the number of sub-regions that need to be searched. However, large sub-regions are more likely to have a larger number of listings per sub-region and thus the more listings per sub-region that have to be searched. In contrast, relatively small sub-regions (in terms of geographical size per sub-region) increase the number of sub-regions that are likely to have a portion within the area of interest and thus increase the number of sub-regions that need to be searched. But small sub-regions are more likely to have a fewer number of listings per sub-region and thus the less listings per sub-region that have to be searched.

The size of the individual sub-regions is relative to the area of interest. According to the known method for location based searching, the total number and individual sizes of sub-regions are adjusted to correspond to the size of the area of interest. Specifically, for relatively large searches (i.e., for relatively large areas of interest), the size of the individual sub-regions is the largest and the number of the sub-regions is the fewest. For relatively small searches (i.e. for relatively small areas of interest) the size of the individual sub-regions is the smallest and the number of the sub-regions is the greatest. And for relatively intermediate searches (i.e., for relatively intermediate areas of interest) the size of the individual sub-regions is between the largest and smallest sizes of the other size searches and the number of sub-regions is between the greatest and fewest numbers of the other size searches.

According to the known method, the quad codes for each listing is dependent on the sub-region in which the listing is located. Therefore, each time the size and number of sub-regions is adjusted, the quad codes for the listings change. Specifically, each listing has a different quad code, one for relatively large searches, one for relatively intermediate searches, and one for relatively small searches. Assigning multiple quad codes to one listing adds complexity to the method.

BRIEF DESCRIPTION OF THE SEVERAL VIEWS OF THE DRAWING(S)

DETAILED DESCRIPTION OF PREFERRED EMBODIMENTS

Exemplary embodiments are described hereinafter with reference to the accompanying drawings, in which exemplary embodiments and examples are shown. Like numbers refer to like elements throughout.

Embodiments relate to providing methods, apparatuses, and computer program products for facilitating a location based search. As used herein, a location based search is a search for particular listings within a particular proximity to or distance from a point of reference or particular location. For example a template for a location based search may include each listing for a particular type of business within a predetermined distance from a particular address. As examples, a location based search may be for Hilton hotels within 10 miles of 100 Main Street, Waltham, Mass. or coffee shops within a mile from Wisconsin's state capitol. A "listing" refers to one item or record of data in a database or entry in a phone directory such as the yellow pages or white pages. A listing includes attributes such as a name of the listing, a type or category of the listing, and a location of the listing. For example, the name of the listing may be a person's name or a company's name; the type or category of the listing may be a particular kind of business, such as a hotel or a restaurant, and the location of the listing may be a street and city address. Therefore, examples of a listing may be Hilton Hotel (business, hotel), 123 $2^{nd}$ Street, Waltham, Mass. or John Doe (personal, residence), 15001 Regina St, Allen Park, Mich.

A group of listings may be stored within or otherwise accessible through one or more electronic databases or directories such as an online yellow pages and/or white pages. The listings may be organized by one or more attributes. For example, the listings may be organized alphabetical by the name of each listing. Moreover, the listings may be organized by strings of attributes. For example, the listings may be organized by the category of each listing then by the name of each listing then by the location of each listing. The listings organized by the strings of attributes may be stored or accessible as a sorted array, a binary tree, a hash table or other one-dimension indexed data table or file. The listings may be searched through the strings of attributes by reviewing the strings of attributes to determine what listings contain each attribute of the search, referred to herein as a string-based search.

A listing may also be assigned a geographical label, which may function as another attribute to be used for location based searching. The geographical label may indicate a sub-region of a searchable region in which the listing is located. Defining locations by sub-regions may be used to focus a location based search to only those listings within sub-regions that are considered close enough to the point of reference and thus reduce the amount of listings that must be considered during the search.

Figure 1:
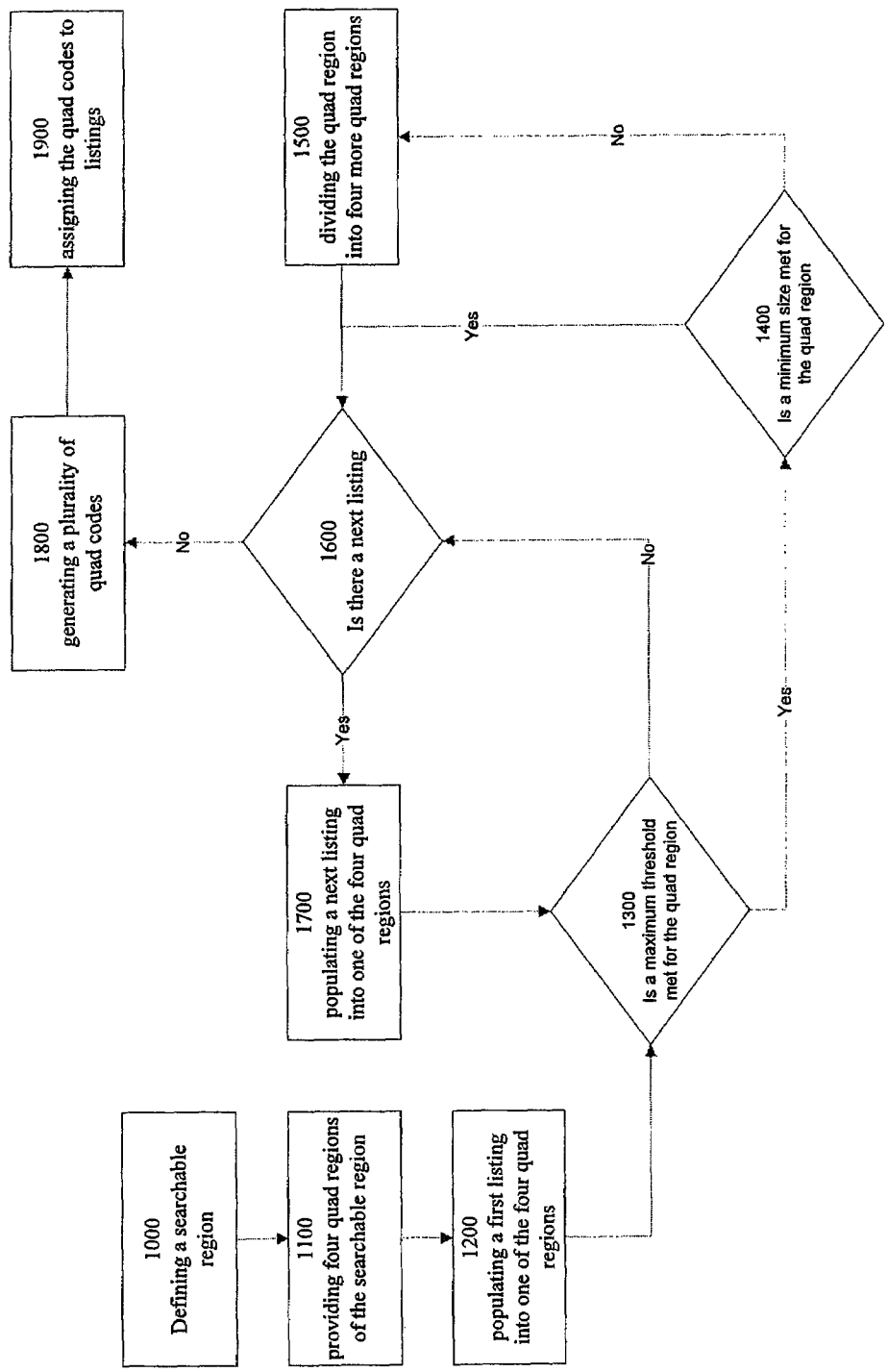
FIG. 1 is a flow chart illustration of a method according to an exemplary embodiment.

FIG. 1 illustrates a method of generating geographical codes, also referred to as quad codes, and assigning a quad code to each listing within a searchable region. The method may include defining a searchable region 1000, populating the searchable region with a population of listings into one or more quad regions of the searchable region 1100, 1200, and generating and assigning quad code for the listings 1800, 1900.

Figure 2:
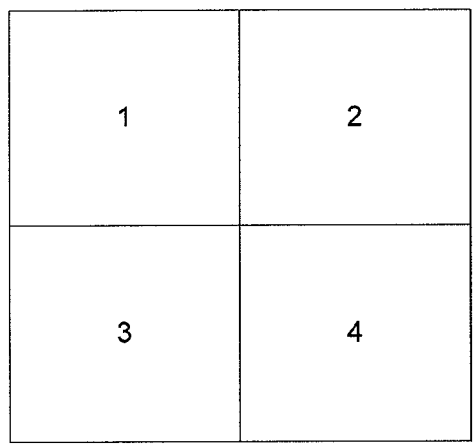
FIG. 2 is a block diagram of a bounding box having four quad regions according to an exemplary embodiment.

The searchable region may be any region that covers the listings that may be of interest or relevant to a particular application. For example, the searchable region may be the entire globe, a continent, a country, a state, a city, or a regional area. In the example of FIG. 2, the searchable region is a bounding box 10 that covers any listing on earth. Although the bounding box in the illustrated embodiments is divided into 4 regions, the bounding box can be divided into any number of regions. Additionally, the bounding box need not be divided into square regions but, instead, can be divided into geographical regions of any shape and size. Further each geographical region need not necessarily have the same shape and size as the other regions.

In this exemplary embodiment, the bounding box 10 is divided into four square or quad regions 1, 2, 3, 4. Each of the quad regions represents a fourth of the searchable region. In this exemplary embodiment, the center of the bounding box 10 represents a center point of reference and each other point within or along a border of one of the quad regions may be referenced to the center of point of reference. Specifically, the other points have a two dimensional location relative to the center point of reference. As illustrated, each other point has a particular distance to the left or the right of the center point of reference and a particular distance up or down to the center point of reference. The relative distances may be quantified through various scaling and numbering systems. For example, each point may be referenced by a longitude and a latitude relative to the center point of reference, such that the up right most corner is (+180°, +90°) and the down left most corner is (−180°, −90°). Or the distances may have a straight number with the center point of reference have 0,0, wherein the first number increases positively the further the point is to the right of the center point of reference and increases negatively the further the point is to the left of the center point of reference. And the second number increases positively the further up the point is from the center point of reference and increases negatively the further down the point is from the center of point of reference. The point of reference may vary. Additionally, the scale and maximum number may vary. For example, the maximum numbers and thus the maximum size of a quad region may be 2, 4, 8, ... $2^k$. As a specific example and as illustrated in FIG. 2, the maximum numbers may 268435456, such that the up right most corner is (+268435456, +268435456) and the lower left most corner is (−268435456, −268435456). Each number may be in geographic information engine ("GIE") units. Each GIE unit corresponds to a particular number or fraction of a meter depending on the maximum number and the overall size of the searchable region. For example, each GIE unit may correspond approximately to 0.1 meters.

Figure 3A:
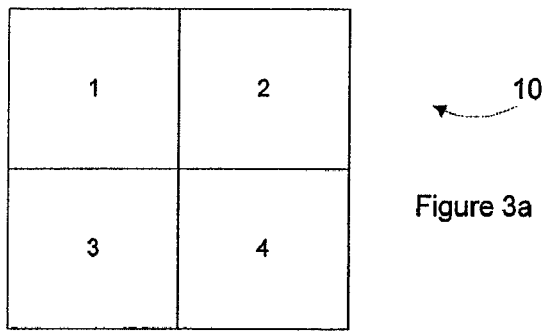
FIG. 3a is a block diagram of a bounding box having a first level of division according to an exemplary embodiment.
Figure 3B:
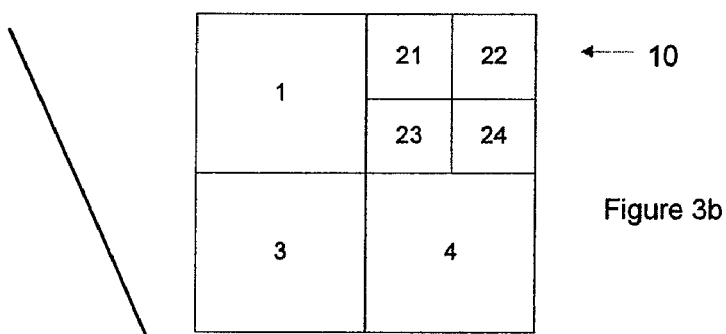
FIG. 3b is a block diagram of the bounding box of FIG. 3a having at least a partial second level of division according to an exemplary embodiment.
Figure 3C:
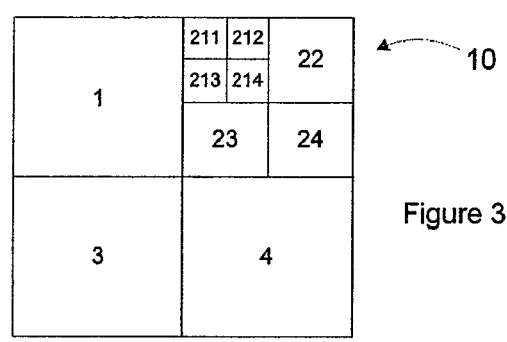
FIG. 3c is a block diagram of the bounding box of FIG. 3b having at least a partial third level of division according to an exemplary embodiment.

As illustrated in FIG. 3a, the bounding box 10 is initially divided into four squares or quad regions 1, 2, 3, 4. Any one of the quad regions 1, 2, 3, 4 may be further divided into four additional quad regions. For example, as illustrated in FIG. 3b, one quad region 2 may be divided into four additional quad regions 21, 22, 23, 24. The process of dividing any of the quad regions into additional quad regions may continue, until the proper resolution is defined. In other words, the bounding box 10 is initially divided at a first level into four quad regions 1, 2, 3, 4 and any or all of the quad regions may be divided on a second level into four additional quad regions and this process may continue to create more quad regions at even higher levels of division, as illustrated in FIGS. 3a through 3c.

The number of quad regions may include setting a maximum number of listings in a quad region. Each quad region corresponds to a geographical area of the searchable region. A number of listings also corresponds to the geographical area. For example, a quad region may contain a city and each listing located in the city would be within the quad region. A threshold number may be set that provides a maximum number of listings within a quad region. Once the maximum threshold number is met then the quad region may be divided into additional four quad regions. The maximum threshold number may be set based on the population listing and its distribution. The greater the maximum threshold number, the less number of quad regions. However, the more listings within a particular quad region the more time and resources it may take to search the quad region for relevant listings. As an example, the maximum threshold number may be between 100 and 1000 for a population of 100 million listings.

The number of quad regions may also include setting a minimum size for any of the quad regions. The minimum size is the smallest size that a quad region can be divided into. In other words, once a particular quad region reaches a predetermined size then that quad region should not be divided into additional quad regions even if the maximum threshold number for listings per quad region is met. One reason for setting a minimum size is to reduce the effect of a plurality of listings sharing the same position or longitude and latitude, such as several businesses located in the same office tower building. As demonstrated further below, the more a quad region is divided into additional quad regions the longer the quad code becomes for the listing within the additional quad regions. Consequently, setting a minimum size for a quad region also sets a maximum length for the quad codes. For example, the maximum length for a quad code may be 16.

The size of a particular quad region may be quantified both in terms of the size of the corresponding geographical area it covers and the number of listings within the quad. If the density of the listing population is homogenously distributed, then the larger the size of the quad region, the larger the number of listings inside it. However, in most applications, the listing population is not homogenous. For example, for business listings, a city area is more densely distributed than a rural area. Therefore, when referring to size of a quad region, the primary consideration in some embodiments may be the number of listings in it.

Populating the searchable region with a population of listings into one or more quad regions of the searchable region may include applying the maximum threshold number and the minimize size rules described above. For example, each listing may be placed into the quad region that corresponds to the geographical area in which the listing is located. If placing a listing into a quad region increases the total number of listing in that quad region above the maximum threshold number then the quad region should be divided into another level of quad regions unless doing so would violate the minimum size for a quad region.

Figure 3D:
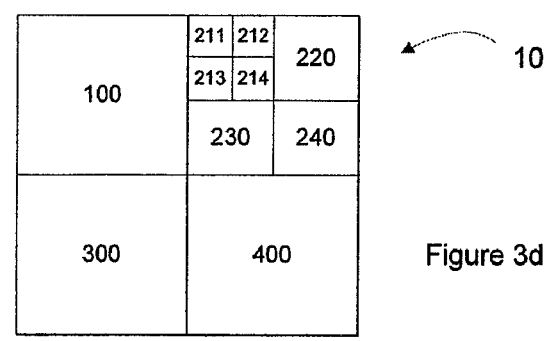
FIG. 3d is a block diagram of the bounding box of FIG. 3c, wherein the quad region numbering is completed according to an exemplary embodiment.

Quad codes may be generated based on the number of quad regions. As illustrated in FIG. 3a, the bounding box 10 may include the four quad regions that are identical squares numbered one through four starting with the left top box and going clockwise. Dividing the bounding box 10 into the four quad regions 1, 2, 3, 4 is considered a first level of division. As described above, any one of the four quad regions may be divided into four more quad regions referred to as a second level of division. Similarly, any of the quad regions of a second level of division may be further divided as a third or more level of division. For each level of division, another digit may be added to each of the quad regions. For example, as illustrated in FIG. 3b, the number 2 quad region may be divided into four additional quad regions and these additional quad regions may be numbered 21 through 24 from the top left quad region clockwise. The first digit "2" is from the first level of division and second digits "1" through "4" is from the second level of division. As illustrated in FIG. 3c, one of the quad region from a second level of division may be further divided into four additional quad regions and these quad regions may be numbers 211 through 214. The first digit "2" is from the first level of division, second digits "1" through "4" is from the second level of division, the third digits "1" through "4" is from the third level of division. In order to provide quad codes having the same length, as illustrated in FIG. 3d, zeros may be added to the other quad regions that do not have the same levels of divisions. Therefore each quad region has a unique number or identifier and each number or identifier has the same number of digits as the other numbers. These numbers or identifiers may be used as quad codes. For example, any listing within the quad region numbered 211 is assigned a quad code of 211. Similarly, any listing within the quad region number 300 is assigned a quad code of 300. It should be noted that the division illustrated in FIGS. 3a through 3d is an example and the number of quad regions may vary between embodiments.

Referring back to FIG. 1 and with reference to the foregoing, an exemplary embodiment may include a method comprising defining a searchable region 1000; providing four quad regions of the searchable region 1100; populating a first listing into one of the four quad regions 1200; if a maximum threshold number is met for the quad region corresponding to the listing 1300 and a minimum size for the quad region is not met 1400 then dividing the quad region into four more quad regions 1500; if there is a next listing 1600 then populating the next listing into one of quad regions 1700; generating quad codes 1800; and assigning quad codes to the listings 1900.

Figures 4A, 4B:
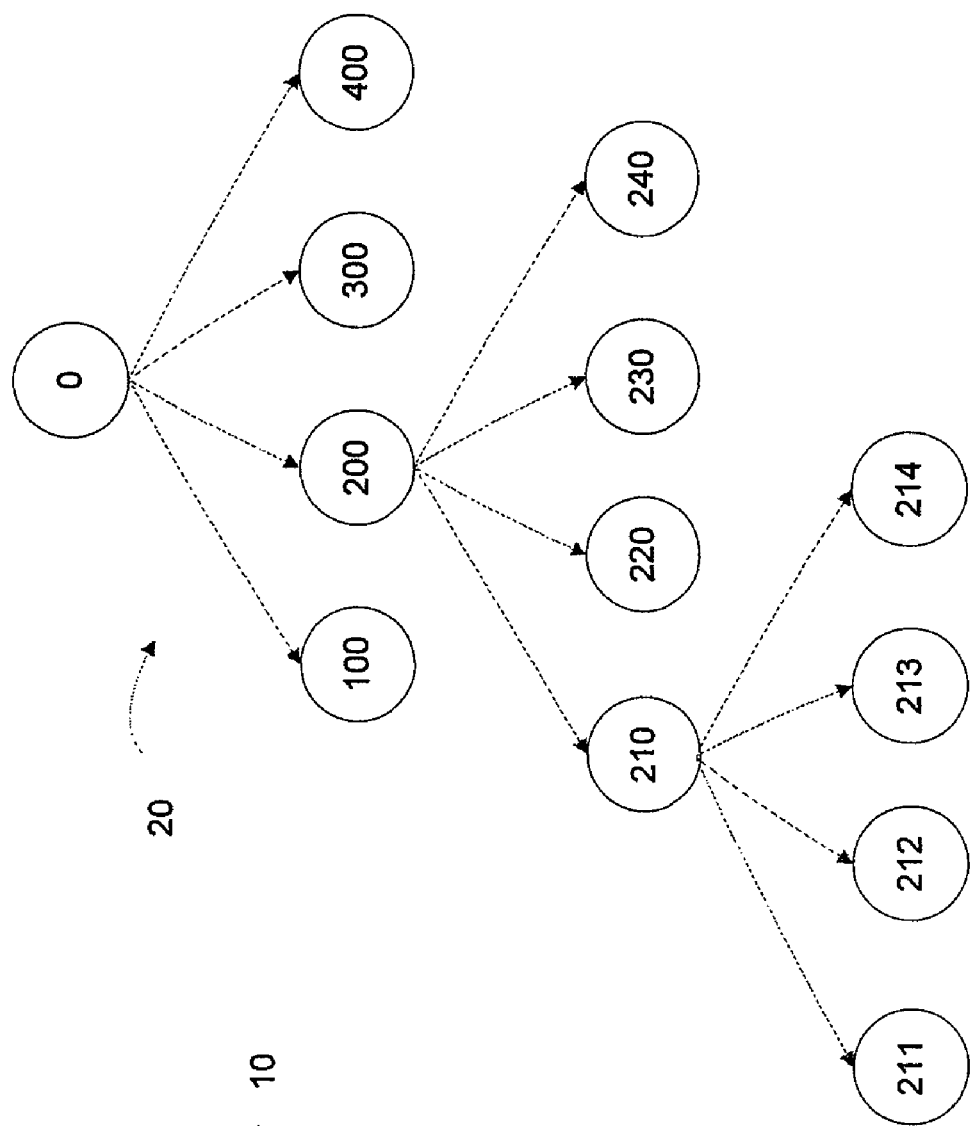
FIG. 4a is a block diagram of a bounding box having a plurality of quad regions according to an exemplary embodiment.
FIG. 4b is a block diagram of a quad tree structure of the bounding box of FIG. 4a according to an exemplary embodiment.

As mentioned above, the assigned quad codes may be treated as another attribute of the listings. Moreover, the quad codes may be used as part of a string of attributes for string base searching. The quad codes may also be organized in a quad tree structure. For example and as illustrated in FIGS. 4a and 4b. FIG. 4a illustrates a bounding box 10 having the quad regions defining the quad codes as described above. FIG. 4b illustrates a quad tree structure 20, wherein the top node, also referred to as a parent node, represents the bounding box. The next level of nodes, i.e. the child nodes of the parent node, represents the quad regions 1, 2, 3, and 4. The child nodes that do not have any nodes (also called leaf nodes) extend down from them represent the quad regions 1, 3, and 4 which do not have any further division levels. The second child node has four nodes extending from it, each of which may be referred to as a grandchild node relative to the parent node. The second child node represents the second quad region which is divided further into four additional quad regions or sub-quad regions. The grandchild nodes that do not have any nodes extend down from them represent the sub-quad regions 2, 3, and 4 which do not have any further division levels. The first grandchild node has four nodes extending from it, which may be referred to as great grandchild nodes relative to the parent node. The first grandchild node represents the sub-quad region 1 which is divided into additional quad regions or sub-sub-quad regions. Organizing or storing the quad codes by a tree structure may facilitate the searching of a particular quad code in some exemplary embodiments.

Figure 5:
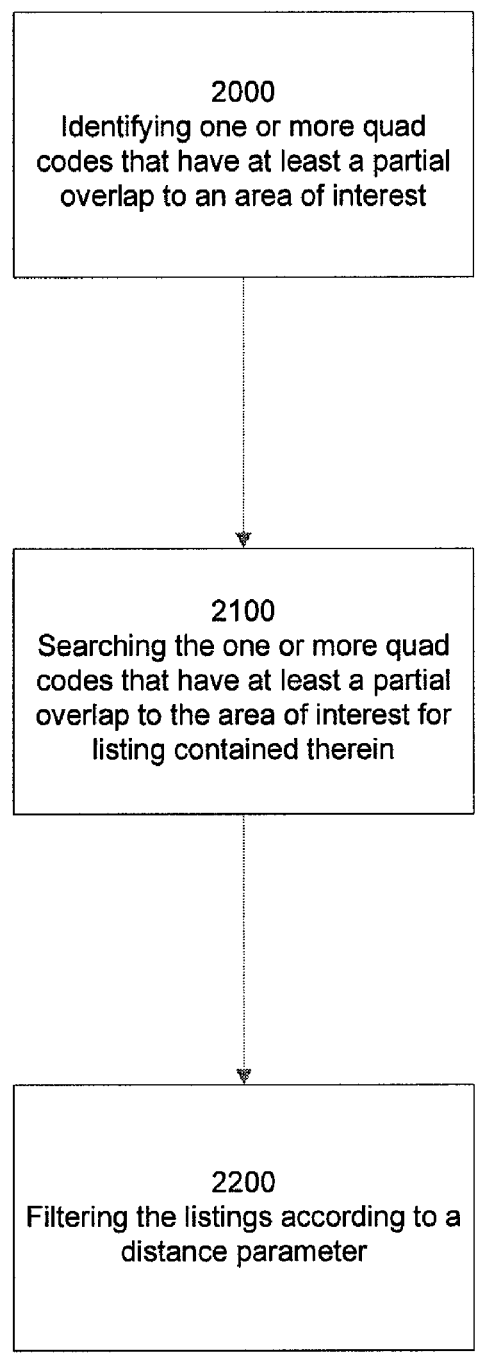
FIG. 5 is a flow chart illustration of a method according to an exemplary embodiment.

FIG. 5 illustrates a method for using quad codes for location based searching. The method includes identifying one or more quad codes that have at least a partial overlap to an area of interest 2000, searching the one or more quad codes that have at least a partial overlap to the area of interest for listings contained therein 2100, and filtering the listings according to a distance parameter or search radius 2200.

Figure 6:
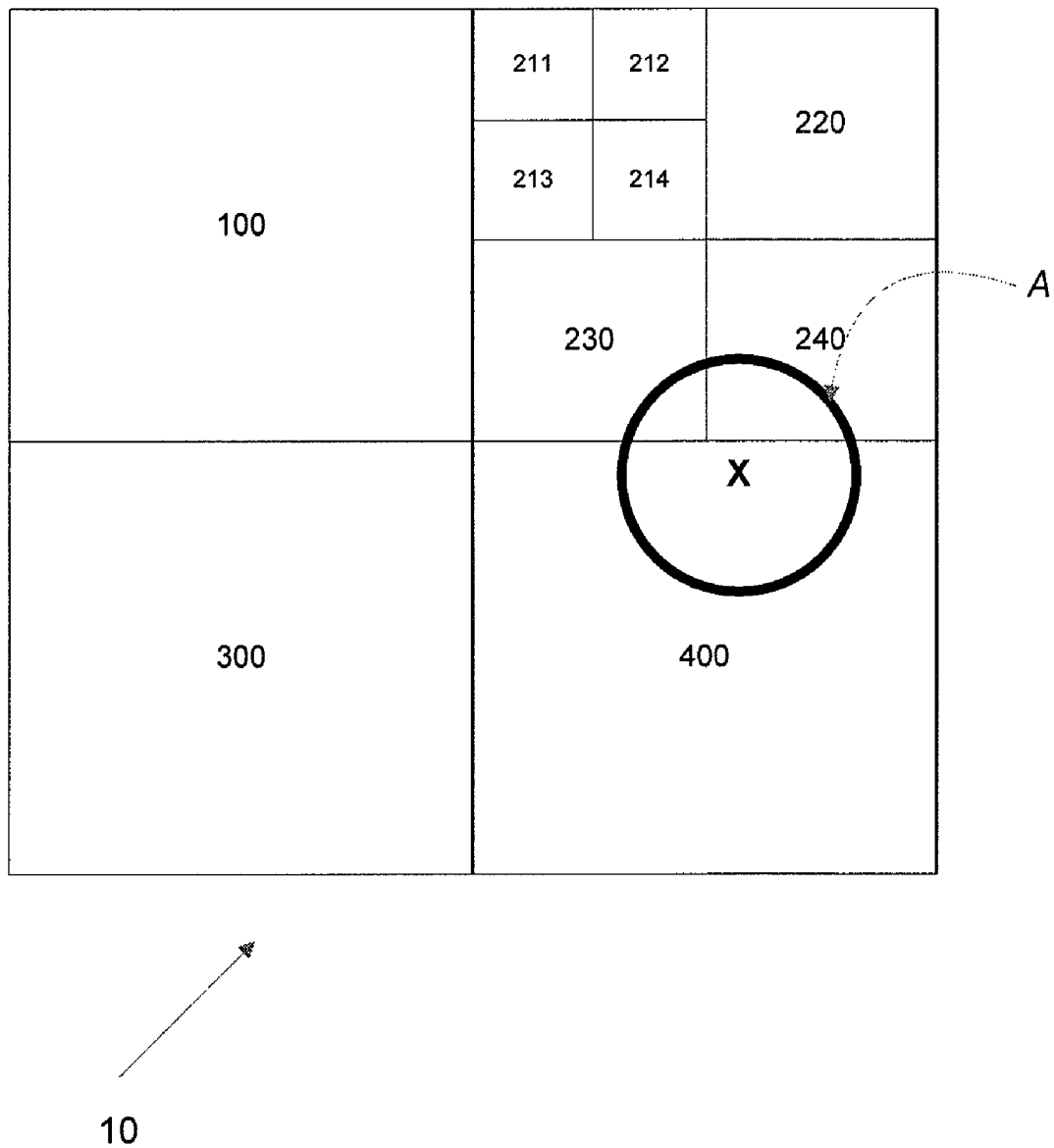
FIG. 6 is a block diagram of a bounding box having a plurality of quad regions and an area of interest overlay according to an exemplary embodiment.

Again as an example, a location based search may be to find the "Hilton Hotels within 10 miles of the location: 100 Main Street, Waltham, Mass." The area of interest for this search is the area within a 10 mile radius from 100 Main Street, Waltham, Mass. Similarly, the distance parameter or search radius is 10 miles. As explained above, the bounding box of quad regions represents the entire geographic searchable region and each quad region of the box represents a particular geographic area. Therefore, as illustrated in FIG. 6, the area of interest A may be mapped or overlaid onto the bounding box 10. Any quad region that has at least a partial overlap with the area of interest A may have one or more listings that are within the area of interest A. Conversely, any quad region that does not have at least a partial overlap with the area of interest A does not have any listings within the area of interest A. Therefore the location based search may focus only on listing within the first group of quad regions and exclude the other listings in the second group of quad regions.

Embodiments may provide search engines to perform string-based searches including searching the quad regions that have at least a partial overlap with the area of interest of a location based search. For example, a generic search template may be <search strings> AND <quad-1 OR quad-2, . . . OR quad-k>, where the search strings may include a list of strings representing listing attributes and quad-k includes the quad regions that have at least a partial overlap with the area of interest. Therefore, for the example used above the search may be <"Hilton" AND "Hotel" AND <quad-230 OR quad-240 OR quad-400>.

Such a search would identify each listing in each of the quad regions that has at least a partial overlap with the area of interest and that has the other searched attributes, which in this example would be a listing for a Hilton Hotel. Some of the listings may be at a distance greater than the distance parameter of the search. Specifically for this example, some of the Hilton Hotel listings may have a distance greater than 10 miles from 100 Main Street, Waltham, Mass., due to the fact that part of the quad region may be outside the area of interest, i.e. those listings that are in quad regions 230, 240, or 400 but outside the circle A illustrated in FIG. 6. Therefore, although a majority of non-qualifying listings may be excluded by focusing the search only on the quad regions that have at least a partial overlap with the area of interest, the identified listings of the quad regions that have at least a partial overlap with the area of interest may be filtered further to exclude any listing greater than the distance parameter.

As discussed above, there is a potential tradeoff involving the sizes of the quad regions. In general, an increase in size leads to an increase in the number of listings per quad region which in turn requires a longer filtering process to filter out the listings of a quad region that are outside the area of interest even though the quad region has at least a partial overlap with the area of interest. Conversely, a decrease in size may lead to an increase in the number of quad regions that have at least a partial overlap with the area of interest and thus more quad regions and their listings become part of the search.

In order to minimize the above tradeoff, different minimum sizes for any one quad region may be used depending on the search range or distance parameter. More specifically, the minimum size of any one quad region may be set to a search range level in order to control the number of quad regions that have at least a partial overlap with the area of interest. Moreover, as explained above the minimum size of the quad regions influences the generation of quad codes and thus the listing may have different sets of quad codes depending on the search range level.

A plurality of search range levels may be set. For example, a first, second, and third search level may be used. The levels may be referred to as a large search, a normal search, and a small search. Although the distances may vary, in this example, a large search is any search range equal to or greater than 20 miles, the normal search is any search range from 5 miles up to 20 miles, and a small search is any search range within 5 miles.

Figure 7:
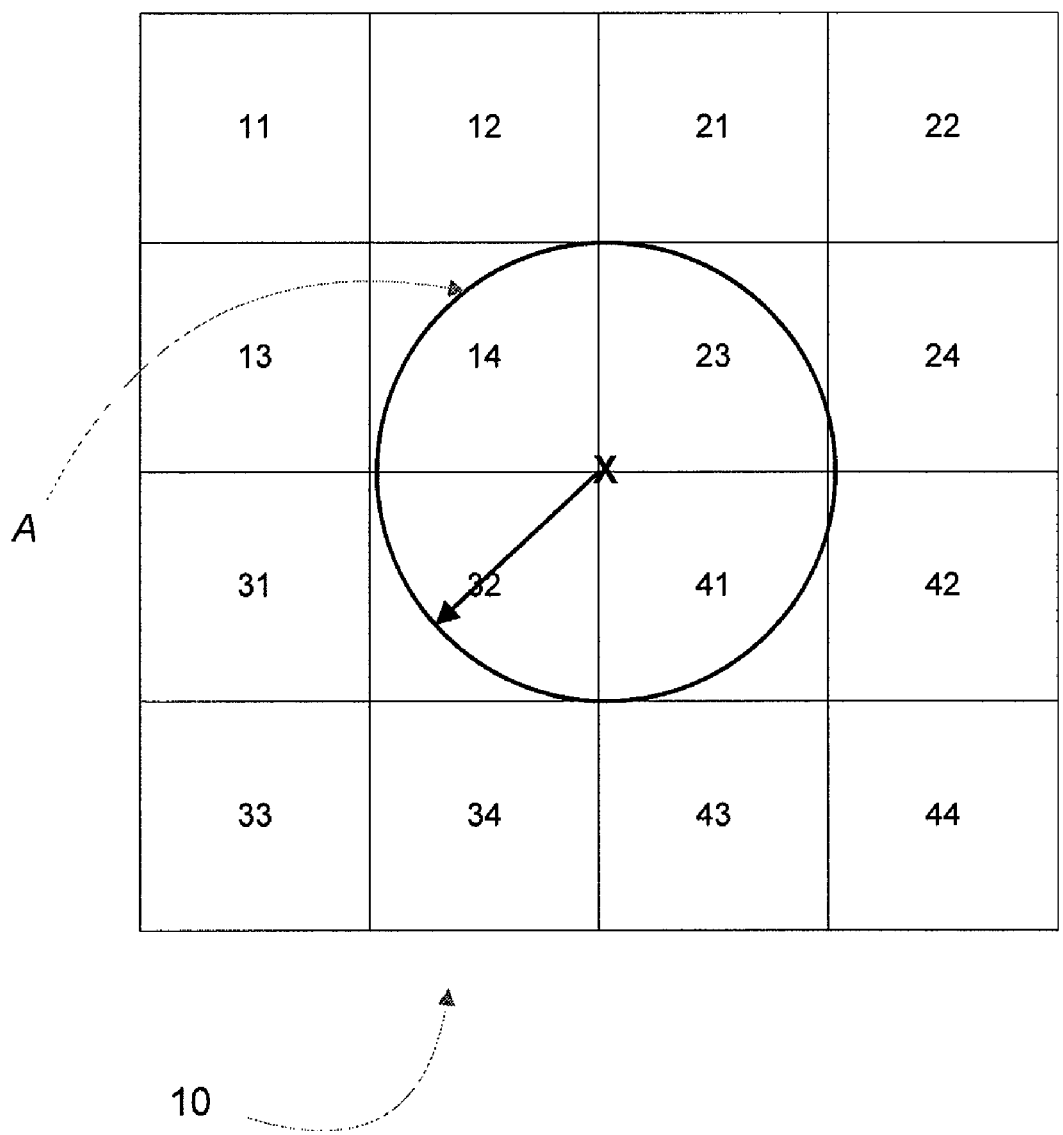
FIG. 7 is a block diagram of a bounding box having a plurality of quad regions and an area of interest overlay, wherein the minimum size of a quad region is approximately equal to a search radius of the area of interest according to an exemplary embodiment.

In some embodiments, for any given search, it may be beneficial to set the number of quad regions having at least a partial overlap with the area of interest and then base the minimum size of the quad regions accordingly. As an example, the number may be set between 4 and 16. And it may be determined that the minimum size for a quad region should be approximately equal to the search range, as shown in FIG. 7.

As noted above, the scale of the bounding box may vary depending on the overall size of the searchable region. For example, one mile may approximately equal to 1,000,000/70 GIE units. The minimum size for a quad region for the three search levels discussed above can be calculated according to the following:

Minimum Quad Region Size(in $GIE$ unit)=Search Range(in miles)*1000000/70

Small level: Within 5 miles (use the mean 2.5 miles for minimum quad region size computation)
2.5*1000,000/70=37,142, then round it to the nearest minimum quad region possible, i.e., the size should be equal to a product of $2^k$.
Nearest minimum size is 32,768
Normal level: Between 5 and 20 miles (use mean range, 5+15/2=12.5 miles)
12.5*1000,000/70=180,000
Nearest minimum quad size is 131,072
Large level: Between 20 and 100 miles (use mean range, 20+80/2=60 miles)
60*1000,000/70=858,571
Nearest minimum quad size is 1,048,576

Based on the different minimum sizes for the different search levels, each listing may be assigned different quad codes for each search level. These different quad codes may be indexed into a listing database or table. And depending on the search range, the searching algorithm or method will process the appropriate quad codes, which in turn should return a number of quad regions having at least a partial overlap with the area of interest within the selected range, e.g., between 4 and 16.

Rather than generating different quad codes for different levels of search ranges, exemplary embodiments may include a prefix matching process. According to this process, each listing has one quad code. The quad codes may be generated as described above. In particular, the quad codes may be generated using the minimum size of the quad regions for one search level, e.g. the small level wherein the search range is 5 miles or less. For the other and larger search levels, if the number of quad regions that have at least a partial overlap with the area interest is too high, then the quad regions may be aggregated according to the next level of quad regions. The original hierarchy structure of the quad regions can be seen from the quad codes because the quad regions from the same higher level quad region share the same prefix digits, e.g. 211, 212, 213, and 214 all share prefix digits "21" so quad "21" is the aggregated quad region of quad regions 211, 212, 213, and 214. Moreover quad regions 211, 212, 213, 214, 220, 230 and 240 all share the prefix digit "2" so quad "2" is the aggregated quad region of quad regions 211, 212, 213, 214, 220, 230, and 240. Prefix matching instead of exact matching for the quad codes may be used for location based searching. For example, instead of "Hilton" AND "Hotel" AND <quad-211 OR quad-212 OR quad-213 OR quad-214 OR quad-220 OR quad-230 OR quad-240>, the following prefix matching search may be used "Hilton" AND "Hotel" AND <prefix-match-to "21" OR quad-220 OR quad-230 OR quad-240>.

A string-based search engine can be configured to perform prefix searches, e.g. it can find those listings in which the prefix substring of a name matches the search string. For example, if the prefix search substring is "Ver", then the search engine can be configured to find those listings whose name are prefix matched to "Ver", e.g. Verizon, Verity, Very Good, etc. The search engine may also be configured to perform a prefix quad code search. For example, the search engine may be configured to find all quad codes which start with digits "21".

Figure 8:
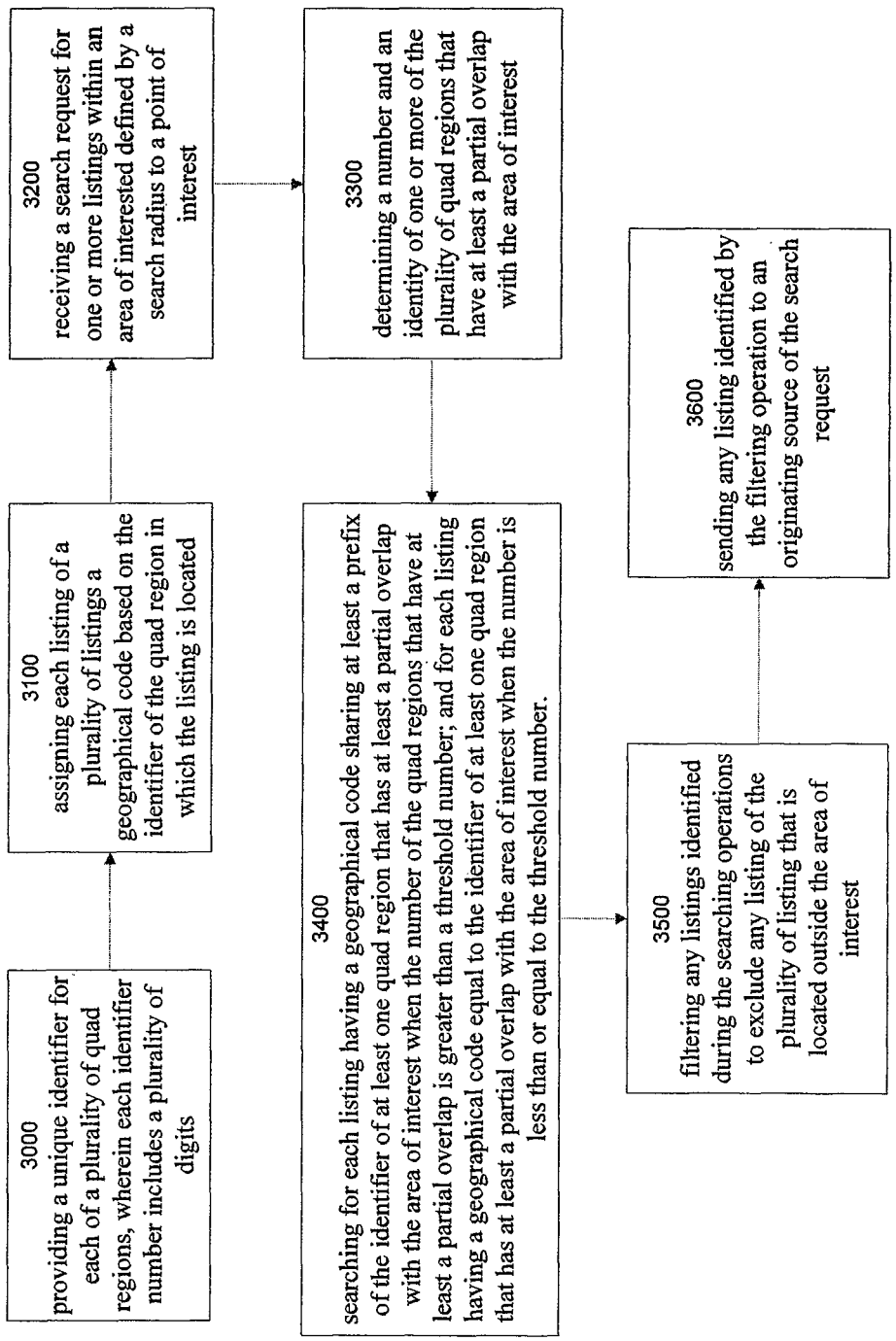
FIG. 8 is a flow chart illustration of a method according to an exemplary embodiment.

According to an exemplary embodiment and as illustrated in FIG. 8, a method for location based searching with prefix matching is provided. The method may include providing a plurality of quad regions, populating the quad regions with listings, and assigning quad codes to the listings based on the location of the listings within the quad codes, as described above and illustrated in FIG. 1. The quad codes, also referred to as geographical codes include a plurality of digits, e.g. a first digit to an nth digit. According to FIG. 8, the method may include providing a unique identifier for each of a plurality of quad regions, wherein each identifier number includes a plurality of digits 3000; assigning each listing of a plurality of listings a geographical code based on the identifier of the quad region in which the listing is located 3100; and receiving a search request for one or more listings within an area of interest defined by a search radius to a point of interest 3200. For example, the point of reference may be a particular address or location such as a street address and the area of interest may be the area within a 5 mile radius from that street address. The request may be for a specific type of listings within the area of interest, e.g. hotel listings. The method also includes determining the number and identity of one or more of the plurality of quad regions that have at least a partial overlap with the area of interest 3300.

The method further includes either (i) searching for each listing of the plurality of listings having a geographical code sharing at least a prefix of the identifier of at least one quad region that has at least a partial overlap with the area of interest when the number of the one or more of the plurality of quad regions that has at least a partial overlap with the area of interest is greater than a threshold number; or (ii) searching for each listing of the plurality of listings having a geographical code equal to the identifier of at least one quad region that has at least a partial overlap with the area of interest when the number of the one or more of the plurality of quad regions that has at least a partial overall with the area of interest is less than or equal to the threshold number 3400. In other words, if the number of quad regions having at least a partial overlap with the area of interest is greater than a threshold number, e.g. 4, 5, . . . , 16, then the searching operation may search for listings having a quad code sharing a prefix with one of the quad regions having at least a partial overlap with the area of interest. For example, the prefix may be the first digit of the identifier, the first and second digits of the identifier, the first digit, the second digit, and the third digit, and so on up to each digit of the identifier excluding the last digit of the identifier. The length of the prefix used may be determined based on an iterative process that includes determining whether the number of quad regions having at least a partial overlap with the area of interest is greater than the threshold number when the total identifiers for the quad regions are used, and if the number is greater than the threshold number then determining whether the number of quad regions having at least a partial overlap with the area of interest is greater than the threshold number when the total identifiers minus one digit are used, and repeating the process by removing another digit for each repetition until the number of quad regions having at least a partial overlap with the area of interest is less than or equal to the threshold number. If the number of quad regions having at least a partial overlap with the area of interest is less than or equal to the threshold number, then the searching operation may search for listing have a quad code equal to the complete identifier of a quad region having at least a partial overlap with the area of interest. As illustrated, the method may further comprise filtering any listings identified during the searching operations to exclude any listing of the plurality of listings that is located outside the area of interest 3500 and sending any listings identified by the filtering operation to an originating source of the search request 3600.

Various applications may use at least some or all of the searching methods described herein to provide location based services. For example, the originating source of the search request may be a communication device and/or computing device of a user requesting information regarding nearby attractions, businesses, or other listings relative to a point of reference. As more specific example, the communication device may be a cellular phone operating within a telecommunication environment. Moreover, in some embodiments, a system or device communicatively coupled to the cellular phone may be configured to perform one or more of the methods described herein in order to provide location based services as further described in U.S. application Ser. No. 11/615,568, entitled "METHOD, SYSTEM, AND COMPUTER PROGRAM PRODUCT FOR PROVIDING LOCATION BASED SERVICES", assigned to the assignee of the present application and filed on the same day as the present application, which is hereby incorporated in its entirety.

It is understood that the operations for any of the methods described herein, including in the appended figures, may be performed through hardware, software, or combination thereof. Therefore embodiments may take the form of hardware systems and/or apparatuses, software, or combinations thereof. As an example, embodiments may include a computer program product having a computer-readable storage medium (e.g., memory) and one or more executable portions (e.g., software) stored on the computer-readable storage medium for performing the operations described herein. As another example, one or more of the devices and/or systems may perform one or more of the operations. For example, a computing device may have a processor element configured to perform one or more of the operations for any of the methods described herein, including in the appended figures.

In the preceding specification, various embodiments of the claimed invention have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. A method comprising:
receiving a search request for one or more listings within an area of interest defined in relation to a point of interest;
identifying a number of geographically indexed reference regions that have at least a partial overlap with the area of interest, each geographically indexed reference region having an associated identifier;
selecting a geographical code matching search precision based on comparing the number of identified geographically indexed reference regions to a threshold number of geographically indexed reference regions overlapping the area of interest, wherein the selecting a geographical code matching search precision comprises:
searching, when the number of identified geographically indexed reference regions is greater than the threshold number of geographically indexed reference regions overlapping the area of interest, for each listing of a plurality of listings having a geographical code sharing at least a prefix of an identifier of at least one of the identified geographically indexed reference regions; and
searching, when the number of identified geographically indexed reference regions is less than or equal to the threshold number of geographically indexed reference regions overlapping the area of interest, for each listing of the plurality of listings having a geographical code equal to the identifier of at least one of the identified geographically indexed reference regions.

2. The method according to claim 1 further comprising providing a unique identifier for each of the one or more geographically indexed reference regions, wherein each unique identifier includes a plurality of digits; and
assigning each listing of the plurality of listings a geographical code based on the unique identifier of a geographically indexed reference region in which the listing is located.

3. The method according to claim 2 further comprising dividing a searchable region into the one or more geographically indexed reference regions; and
populating the searchable region with the plurality of listings.

4. The method according to claim 3, wherein the dividing the searchable region into the plurality of geographically indexed reference regions includes further dividing a geographically indexed reference region into additional geographically indexed reference regions when a number of listings within the geographically indexed reference region reaches a maximum number unless dividing the geographically indexed reference region would reduce a size of the geographically indexed reference region below a minimum number.

5. The method according to claim 1 further comprising filtering any listings identified during the searching to exclude any listing that is located outside the area of interest.

6. The method according to claim 5 further comprising responding to the search request with any listings identified by the filtering.

7. The method according to claim 1, wherein the receiving the search request for one or more listings within the area of interest defined by a distance to a point of interest and the searching further include searching for one or more listings within the area of interest and having one or more specified attributes.

8. A computer program product comprising a non-transitory computer-readable storage medium having computer-readable program code portions stored therein, the computer-readable program code portions comprising:
a first executable portion configured to receive a search request for one or more listings within an area of interest defined by a distance to a point of interest;
a second executable portion configured to determine a number and an identity of one or more geographically indexed reference regions that have at least a partial overlap with the area of interest; and
a third executable portion configured to select a geographical code matching search precision based on comparing the number of identified geographically indexed reference regions to a threshold number of geographically indexed reference regions overlapping the area of interest, wherein the third executable portion configured to select a geographical code matching search precision comprises
(i) search for each listing of a plurality of listings having a geographical code sharing at least a prefix of the identifier of at least one of the one or more geographically indexed reference regions that has at least a partial overlap with the area of interest when the number of the one or more geographically indexed reference regions that have at least a partial overlap with the area of interest is greater than the threshold number of geographically indexed reference regions overlapping the area of interest, and (ii) search for each listing of the plurality of listings having a geographical code_equal to the identifier of at least one of the one or more geographically indexed reference regions that has at least a partial overlap with the area of interest when the number of the one or more geographically indexed reference regions that have at least a partial overlap with the area of interest is less than or equal to the threshold number of geographically indexed reference regions overlapping the area of interest.

9. The computer program product according to claim 8 further comprising a fourth executable portion configured to provide a unique identifier for each of the one or more geographically indexed reference regions, wherein each unique identifier number includes a plurality of digits; and
a fifth executable portion configured to assign each listing of the plurality of listings a geographical code based on the unique identifier of a geographically indexed reference region in which the listing is located.

10. The computer program product according to claim 9 further comprising a sixth executable portion configured to divide a searchable region into the plurality of geographically indexed reference regions; and a seventh executable portion configured to populate the searchable region with the plurality of listings.

11. The computer program product according to claim 10, wherein the sixth executable portion is further configured to divide a geographically indexed reference region into additional geographically indexed reference regions when a number of listings within the geographically indexed reference region reaches a maximum number unless dividing the geographically indexed reference region would reduce a size of the geographically indexed reference region below a minimum number.

12. The computer program product according to claim 8 further comprising a fourth executable portion configured to filter any listings identified during the searching of the third executable portion to exclude any listing of the plurality of listings that is located outside the area of interest.

13. The computer program product according to claim 12 further comprising a fifth executable portion for responding to the search request with any listings identified by the filtering of the fourth executable portion.

14. The computer program product according to claim 8, wherein the first executable portion is further configured to receive the search request for one or more listings within an area of interest that have one or more specified attributes and the third executable portion ifs further configured to either
(i) search for one or more listings having the one or more specific attributes and a geographical code sharing at least a prefix of the identifier of at least one of the one or more geographically indexed reference regions that has at least a partial overlap with the area of interest when the number of the one or more geographically indexed reference regions that have at least a partial overlap with the area of interest is greater than a threshold number, or
(ii) search for each listing of the plurality of listings having the one or more specific attributes and a geographical code equal to the identifier of at least one of the one or more geographically indexed reference regions that has at least a partial overlap with the area of interest when the number of the one or more geographically indexed reference regions that have at least a partial overlap with the area of interest is less than or equal to the threshold number.

15. An apparatus comprising:
a memory; and a processor configured to receive a search request for one or more listings within an area of interest defined by a distance to a point of interest;

the processor configured to determine a number and an identity of one or more geographically indexed reference regions that have at least a partial overlap with the area of interest; and the processor configured to select a geographical code matching search precision based on comparing the number of identified geographically indexed reference regions to a threshold number of geographically indexed reference regions overlapping the area of interest, wherein the configured to select a geographical code matching search precision comprises:

(i) search for each listing of a plurality of listings having a geographical code sharing at least a prefix of the identifier of at least one of the one or more geographically indexed reference regions that has at least a partial overlap with the area of interest when the number of the one or more geographically indexed reference regions that have at least a partial overlap with the area of interest is greater than a threshold number of geographically indexed reference regions overlapping the area of interest, and (ii) search for each listing of the plurality of listings having a geographical code equal to the identifier of at least one of the one or more geographically indexed reference regions that has at least a partial overlap with the area of interest when the number of the one or more geographically indexed reference regions that have at least a partial overlap with the area of interest is less than or equal to the threshold number of geographically indexed reference regions overlapping the area of interest.

16. The apparatus according to claim 15, wherein the processor is further configured to provide a unique identifier for each of the one or more geographically indexed reference regions, wherein each unique identifier number includes a plurality of digits; and to assign each listing of the plurality of listings a geographical code based on the unique identifier of a geographically indexed reference region in which the listing is located.

17. The apparatus according to claim 16, wherein the processor is further configured to divide a searchable region into the plurality of geographically indexed reference regions; and to populate the searchable region with the plurality of listings.

18. The apparatus according to claim 17, wherein the processor is further configured to divide a geographically indexed reference region into additional geographically indexed reference regions when a number of listings within the geographically indexed reference region reaches a maximum number unless dividing the geographically indexed reference region would reduce a size of the geographically indexed reference region below a minimum number.

19. The apparatus according to claim 15, wherein the processor is further configured to filter any listings identified during the searching to exclude an listing of the plurality of listings that is located outside the area of interest.

20. The apparatus according to claim 19, wherein the processor is further configured to respond to the search request with any listings identified by the filtering.

21. The apparatus of claim 15, wherein the processor is further configured to receive the search request for one or more listings within an area of interest that have one or more specified attributes and to either (i) search for one or more listings having the one or more specific attributes and a geographical code sharing at least a prefix of the identifier of at least one of the one or more geographically indexed reference regions that has at least a partial overlap with the area of interest when the number of the one or more geographically indexed reference regions that have at least a partial overlap with the area of interest is greater than a threshold number, or (ii) search for each listing of the plurality of listings having the one or more specific attributes and a geographical code equal to the identifier of at least one of the one or more geographically indexed reference regions that has at least a partial overlap with the area of interest when the number of the one or more geographically indexed reference regions that have at least a partial overlap with the area of interest is less than or equal to the threshold number.

22. The method of claim 1, wherein searching when the number of identified geographically indexed reference regions is greater than the threshold further comprises: determining a length of the prefix.

23. The method of claim 22, wherein determining the length of the prefix further comprises:

repeatedly removing a digit of the identifier of the at least one of the geographically indexed reference regions until the number of identified geographically indexed reference regions is less than or equal to the threshold.

* * * * *